(12) United States Patent
Horbez et al.

(10) Patent No.: US 10,414,667 B2
(45) Date of Patent: Sep. 17, 2019

(54) PROCESS FOR THE RECOVERY OF SODIUM SULFATE

(71) Applicant: RHODIA OPERATIONS, Paris (FR)

(72) Inventors: Dominique Horbez, Franconville (FR); Enrico Drioli, Naples (IT)

(73) Assignee: RHODIA OPERATIONS, Paris (FR)

( * ) Notice: Subject to any disclaimer, the term of this patent is extended or adjusted under 35 U.S.C. 154(b) by 0 days.

(21) Appl. No.: 15/748,528

(22) PCT Filed: Jun. 1, 2016

(86) PCT No.: PCT/EP2016/062359
§ 371 (c)(1),
(2) Date: Jan. 29, 2018

(87) PCT Pub. No.: WO2017/016712
PCT Pub. Date: Feb. 2, 2017

(65) Prior Publication Data
US 2018/0222758 A1    Aug. 9, 2018

(30) Foreign Application Priority Data

Jul. 28, 2015   (EP) .................................. 15306229

(51) Int. Cl.
| | | |
|---|---|---|
| *C01D 5/00* | (2006.01) | |
| *C01D 5/02* | (2006.01) | |
| *B01D 61/36* | (2006.01) | |
| *C01B 33/193* | (2006.01) | |
| *C01D 5/18* | (2006.01) | |
| *C01D 5/16* | (2006.01) | |
| *C02F 1/44* | (2006.01) | |
| *C02F 101/10* | (2006.01) | |
| *C02F 103/34* | (2006.01) | |

(52) U.S. Cl.
CPC .............. *C01D 5/02* (2013.01); *B01D 61/364* (2013.01); *C01B 33/193* (2013.01); *C01D 5/16* (2013.01); *C01D 5/18* (2013.01); *C02F 1/447* (2013.01); *B01D 2311/04* (2013.01); *B01D 2311/2642* (2013.01); *B01D 2311/2649* (2013.01); *C02F 2101/101* (2013.01); *C02F 2103/34* (2013.01); *Y02W 10/37* (2015.05)

(58) Field of Classification Search
CPC ........ C01D 5/00–18; C01B 33/12–193; B01D 61/364; B01D 61/366; B01D 2311/04; B01D 2311/2642; B01D 2311/2649; B01D 2311/2673
USPC .......................... 423/335–339, 179, 199, 551
See application file for complete search history.

(56) References Cited

U.S. PATENT DOCUMENTS

| | | |
|---|---|---|
| 5,403,570 A | 4/1995 | Chevallier et al. |
| 5,800,608 A | 9/1998 | Bomal et al. |
| 5,876,494 A | 3/1999 | Bomal et al. |
| 5,882,617 A | 3/1999 | Chevallier et al. |
| 6,107,226 A | 8/2000 | Chevallier |
| 6,169,135 B1 | 1/2001 | Chevallier et al. |
| 6,217,840 B1 | 4/2001 | Barnett et al. |
| 6,365,051 B1* | 4/2002 | Bader .................. B01D 61/147 210/640 |
| 7,501,065 B1 | 3/2009 | Bader |
| 2004/0062701 A1 | 4/2004 | Valero et al. |
| 2005/0032965 A1 | 2/2005 | Valero |
| 2011/0178227 A1 | 7/2011 | Allain et al. |
| 2011/0180479 A1* | 7/2011 | Cordatos .............. B01D 61/364 210/640 |
| 2011/0209413 A1* | 9/2011 | Nishida ................... C01B 33/14 51/308 |
| 2011/0259822 A1 | 10/2011 | A-Jlil |
| 2013/0156674 A1 | 6/2013 | Guy et al. |

FOREIGN PATENT DOCUMENTS

| | | |
|---|---|---|
| EP | 396450 A | 11/1990 |
| EP | 520862 A | 12/1992 |
| EP | 670813 A | 9/1995 |
| EP | 670814 A | 9/1995 |
| EP | 762992 A | 3/1997 |
| EP | 762993 A | 3/1997 |
| EP | 1355856 A | 10/2003 |
| WO | 2003016215 A1 | 2/2003 |
| WO | 2009112458 A1 | 9/2009 |
| WO | 201117400 A1 | 9/2011 |
| WO | 2012081981 A1 | 6/2012 |

* cited by examiner

Primary Examiner — Steven J Bos

(57) ABSTRACT

A process for the recovery of sodium sulfate from water, in particular from water deriving from a silica manufacturing process.

17 Claims, 4 Drawing Sheets

# PROCESS FOR THE RECOVERY OF SODIUM SULFATE

REFERENCE TO RELATED APPLICATIONS

The present application is a U.S. national phase entry under 35 U.S.C. 071 of International Application No. PCT/EP2016/062359, filed on Jun. 1, 2016, which claims priority to European application No. EP15306229.4, filed on Jul. 28, 2015. The entire content of each of these applications is explicitly incorporated herein by reference.

TECHNICAL FIELD

The invention relates to an energy efficient process for the recovery of sodium sulfate from water, in particular from water deriving from a precipitated silica manufacturing process.

BACKGROUND ART

Sodium sulfate ($Na_2SO_4$) is a commodity product widely used in the detergent and paper making industries.

Large volumes of waste waters containing $Na_2SO_4$ are generated each year in the manufacture of precipitated silica. So far, in view of its abundant availability and reduced cost, the recovery of $Na_2SO_4$ from these waste waters has not been economically attractive.

Precipitated silica is a synthetic, finely divided, white, amorphous form of silicon dioxide. Precipitated silica is typically obtained via the reaction of an alkaline silicate solution with a mineral acid. In a typical process, sulfuric acid and sodium silicate solutions are reacted under agitation according to the following reaction scheme:

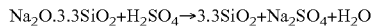

$Na_2O.3.3SiO_2+H_2SO_4 \rightarrow 3.3SiO_2+Na_2SO_4+H_2O$

The resulting precipitate is filtered, washed and dried in the manufacturing process.

The precipitated silica production process generates large volumes of wastewater containing large amounts of dissolved sodium sulfate. Although sodium sulfate is environmentally safe, the possibility to recover it from precipitated silica wastewaters in an economically viable fashion would represent an advantageous improvement of the overall precipitated silica manufacturing process.

Large amounts of heat are also required to dry the wet precipitated silica at the end of the manufacturing process. Drying may be carried using any known technique, such as spray drying, fluid bed drying, rotary drying and the like, wherein a suspension containing the precipitated silica particles is dried by means of hot dry air. At the end of the drying process large volumes of hot gas, mainly water vapour, are discharged from the drying apparatus and typically wasted.

It has now been found that it is possible to use the residual heat of the drying step in a precipitated silica manufacturing process in a membrane distillation process which allows recovering $Na_2SO_4$ from a water stream.

The process is particularly advantageous when the water stream containing $Na_2SO_4$ is produced in the precipitated silica manufacturing process. The combination of the heat discharged from the drying step with the membrane distillation process allows an economically advantageous route for the recovery of $Na_2SO_4$ from water generated in the precipitated silica manufacturing process.

It has been found that the temperature differential required for a membrane distillation process for the recovery of $Na_2SO_4$ from water, in particular from water produced in a precipitated silica manufacturing process, can be advantageously obtained by using the residual heat contained in the flow of hot gas discharged from the drying step of the precipitated silica manufacturing process itself.

SUMMARY OF INVENTION

A first objective of the present invention is to provide a process for the recovery of $Na_2SO_4$ from a water stream by means of a membrane distillation process, said process using the heat generated in a drying apparatus to provide and maintain the thermal gradient needed to the membrane distillation process.

A second objective of the present invention is to provide an economically advantageous process for the manufacture of precipitated silica which comprises the recovery of $Na_2SO_4$ from water containing $Na_2SO_4$.

DESCRIPTION OF INVENTION

Figure 1:
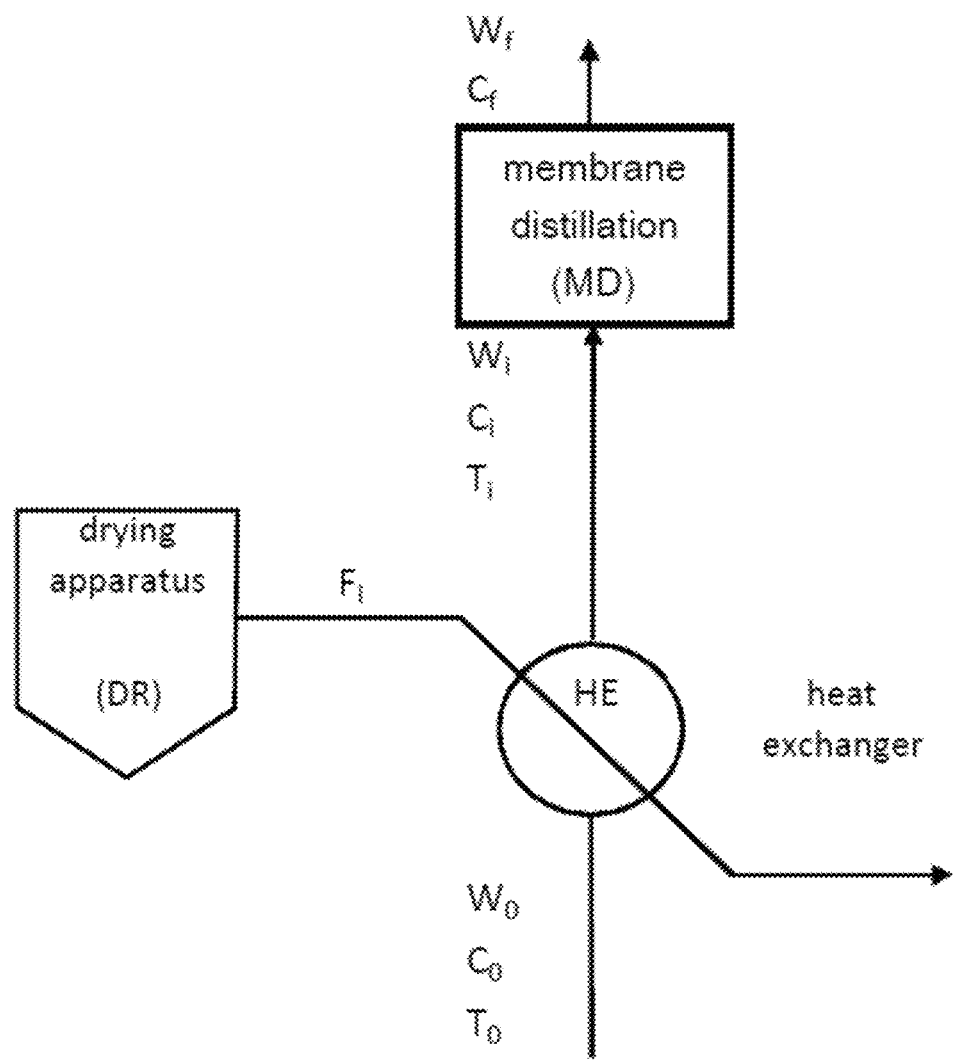
FIG. 1: is a block diagram of an embodiment of the inventive process comprising: a heat-exchanger HE to raise the temperature of water stream $W_0$ using the flow of hot gas $F_i$ discharged from a drying apparatus DR; and a membrane distillation unit MD for the concentration of water stream $W_i$ containing $Na_2SO_4$.

A first object of the present invention is a process for the recovery of $Na_2SO_4$ from a water stream, said process comprising the steps of:
  providing a water stream $W_0$ comprising $Na_2SO_4$;
  providing a flow of hot gas discharged from a drying apparatus;
  providing heat to water stream $W_0$ in a heat-exchanger by means of the flow of hot gas to obtain water stream $W_i$ at a temperature $T_i$;
  providing a membrane distillation unit comprising at least one membrane creating a feed side and a permeate side within the membrane distillation unit;
  feeding water stream $W_i$ comprising $Na_2SO_4$ at a concentration $C_i$ to the feed side of the membrane distillation unit at a temperature $T_i$ greater than the temperature $T_p$ at the permeate side of the membrane distillation unit to obtain a water stream $W_f$ containing $Na_2SO_4$ at a concentration $C_f > C_i$; and optionally separating solid $Na_2SO_4$ from water stream $W_f$.

The term "heat-exchanger" is used herein to refer to any means suitable for transferring heat from a flow of hot gas to a water stream. There are no limitations on the type or design of the heat-exchanger for use in the inventive process.

The transfer of heat from the flow of hot gas to water stream $W_0$ may be direct, that is involving a direct contact of the hot gas with the water stream. Alternatively, the transfer of heat may take place indirectly by means of one or more intermediate steps or devices.

The step of providing heat to water stream $W_0$ by means of the flow of hot gas may take place in the membrane distillation unit. Alternatively, the step of providing heat to water stream $W_0$ by means of the flow of hot gas may take place independently from the membrane distillation unit.

The process may comprise additional steps, such as pre-treatment and/or concentration steps before submitting water stream $W_0$ to the membrane distillation step.

Recovery of $Na_2SO_4$ can be accomplished either in the form of a concentrated solution of $Na_2SO_4$ or in the form of solid $Na_2SO_4$.

When solid $Na_2SO_4$ is the desired end-product, additional steps can be applied to water stream $W_f$ before $Na_2SO_4$ is recovered. Typically, water stream $W_f$ is subjected to a step of concentration by evaporation before $Na_2SO_4$ is recovered as a solid.

The term "water stream $W_0$" is used herein to refer to water containing $Na_2SO_4$ and optionally other contaminants and issuing from an industrial process. $Na_2SO_4$ is recovered from water stream $W_0$ by means of the inventive process. In water stream $W_0$ $Na_2SO_4$ is the main product, that is the product which is present at the highest concentration. The water stream containing $Na_2SO_4$ may be generated in any industrial process.

In an embodiment of the inventive process, the drying apparatus providing the flow of hot gas and water stream $W_0$ derive from the same industrial process.

In a preferred embodiment of the inventive process the water stream containing $Na_2SO_4$ derives from a process for the manufacture of precipitated silica. Processes for the preparation of precipitated silica are known. Notable non-limiting examples are disclosed for instance in EP396450A, EP520862A, EP670813A, EP670814A, EP762992A, EP762993A, EP917519A, EP1355856A, WO03/016215, WO2009/112458, WO2011/117400.

A process for the production of precipitated silica generally comprises the steps of:
reacting at least one silicate with at least one acidifying agent, to provide a silica suspension;
submitting said silica suspension to filtration and optionally washing to provide a filter cake;
optionally submitting said filter cake to a liquefaction step to obtain a suspension of precipitated silica; and
drying the suspension of wet precipitated silica obtained after the liquefaction step in a drying apparatus.

The choice of the acidifying agent and of the silicate is made in a way well known in the art. Preferably, use is made of sulfuric acid and sodium silicate.

Any common form of silicate may be used in the process, such as metasilicates, disilicates and advantageously sodium silicate. Sodium silicate generally exhibits a ratio $SiO_2/Na_2O$ by weight of between 2.0 and 4.0, in particular between 2.4 and 3.9, for example between 3.1 and 3.8.

The silicate initially present in the vessel conventionally has a concentration (expressed in terms of $SiO_2$) of between 40 and 330 g/l, for example between 60 and 300 g/l.

A silicate and an electrolyte may be initially charged in the reaction vessel. When sodium silicate and sulfuric acid are used as reagents the electrolyte is typically sodium sulfate.

More specifically the water stream suitable for the recovery process of the invention can be obtained from a process for the preparation of precipitated silica which comprises the following steps:
reacting sodium silicate and sulfuric acid in an aqueous liquid medium to obtain a suspension of precipitated silica;
separating the precipitated silica from the aqueous liquid medium to provide wet precipitated silica and a water stream containing $Na_2SO_4$.

The process for the preparation of precipitated silica typically comprises at least one additional step of drying the wet precipitated silica in a drying apparatus, said apparatus discharging a flow of hot gas.

The wet precipitated silica, before drying, may be subjected to one or more washing operations. The water recovered from the one or more washing operations may be merged with the water stream recovered from the step of separating the precipitated silica from the reaction medium to provide a water stream $W_0$.

Advantageously, water stream $W_0$ consists of the water stream recovered from the step of separating the precipitated silica from the reaction medium.

In an advantageous embodiment, the inventive process for the recovery of $Na_2SO_4$ from a water stream comprises the steps of:
reacting sodium silicate and sulfuric acid in an aqueous liquid medium to obtain a suspension of precipitated silica;
separating the precipitated silica from the aqueous liquid medium to provide wet precipitated silica and a water stream $W_0$ containing $Na_2SO_4$;
providing a flow of hot gas discharged from a drying apparatus;
providing heat to water stream $W_0$ in a heat-exchanger by means of the flow of hot gas to obtain water stream $W_i$ at a temperature $T_i$;
providing a membrane distillation unit comprising at least one membrane creating a feed side and a permeate side within the membrane distillation unit;
feeding water stream $W_i$ comprising $Na_2SO_4$ at a concentration $C_i$ to the feed side of the membrane distillation unit at a temperature $T_i$ greater than the temperature $T_p$ at the permeate side of the membrane distillation unit to obtain a water stream $W_f$ containing $Na_2SO_4$ at a concentration $C_f > C_i$; and
optionally separating solid $Na_2SO_4$ from water stream $W_f$.

Water stream $W_0$ contains $Na_2SO_4$ at a concentration $C_0$.

The concentration of $Na_2SO_4$ as well as the nature and respective amounts of other ions or compounds present in water stream $W_0$ may vary broadly and may depend on different factors.

One factor which may determine the composition of water stream $W_0$ is the source and chemical nature of the sand used in the silicate manufacturing process. It is known that sodium silicates are obtained by hot treatment of natural quartz sand with sodium hydroxide or with soda ash.

A second possible factor affecting the composition of water stream $W_0$ may be the process for the preparation of the precipitated silica itself which may involve different ratios for the reactants, the presence of specific electrolytes or additives or other variations in the process.

Additional ions which may be present in water stream $W_O$ are typically Ca, Mg, Al, Fe. Water stream $W_O$ typically also contains silica, both in suspended and/or in dissolved form.

The concentration of $Na_2SO_4$ in water stream $W_O$ may vary widely and it is not a limiting factor on the ability of the inventive process to effectively recover $Na_2SO_4$. Concentration $C_O$ may be as low as 2.0 wt %, even as low as 3.0 wt %. Concentration $C_O$ may be up to 8.0 wt %, even up to 10.0 wt %. Typical values of concentration $C_O$ may be between 2.5 to 7.0 wt %, even between 3.5 and 6.5 wt %.

In the process of the invention (schematically shown in FIG. 1) water stream $W_O$, as defined above, is fed to a heat-exchanger (indicated as HE in FIG. 1) wherein heat is provided by the flow of hot gas (indicated as $F_i$) which is discharged by a drying apparatus (identified as DR in FIG. 1).

The temperature of water stream $W_O$ is generally raised in the heat-exchanger from $T_0$ to $T_i$ due to the heat provided by the flow of hot gas.

The expression "water stream $W_i$" is used herein to indicate water stream at temperature $T_i$. Temperature $T_i$ of water stream $W_i$ at the exit of the heat-exchanger and at the inlet of the membrane distillation unit will be selected based on the operating conditions of the process.

The initial temperature $T_0$ of water stream $W_O$ depends on several factors, including its source. When water stream $W_O$ is a water stream produced during the filtration step in the precipitated silica manufacturing process, wherein wet precipitated silica is separated from the aqueous reaction medium, its temperature $T_0$ may be up to 70° C., even up to 85° C.

When water stream $W_O$ is a water stream produced by combining the water stream produced during the filtration step, as discussed above, and the water deriving from the one or more washing operations of the wet precipitated silica, the temperature generally does not exceed 50° C., even 40° C.

When water stream $W_O$ undergoes a pre-concentration step using nanofiltration or reverse osmosis, as hereinafter described, temperature $T_0$ also generally does not exceed 50° C., even 40° C. to avoid damaging the ultrafiltration or reverse osmosis membranes.

The temperature of water stream $W_O$ is generally of at least 15° C.

Membrane distillation is a thermally driven process in which separation is enabled due to phase change: a membrane, typically a porous hydrophobic membrane, provides a barrier for the liquid phase but it allows the vapour phase (e.g. water vapour) to pass through the membrane's pores condensing on the other side of the membrane. The driving force of the process is given by a partial vapour pressure difference triggered by a temperature difference: the higher the temperature gradient between the two sides of the membrane, the higher the productivity of the membrane distillation process. The process typically requires high amounts of thermal energy to maintain the temperature gradient across the membrane: the evaporation of water from one side of the membrane promotes a reduction of the temperature of the water stream which should be at the highest temperature, heat has thus to be constantly provided to this water stream to maintain its temperature.

It is thus necessary, to maintain the efficiency of the membrane distillation process, to increase the temperature of water stream before feeding it to the membrane distillation unit and to maintain it to such a level that a temperature differential across the membrane is maintained throughout the membrane distillation process.

In the process of the invention, the heat required to achieve and maintain the temperature differential across the membrane is provided in a heat-exchanger, as defined above, which is operated using the residual heat discharged by a drying apparatus. Any conventional heat-exchanger can be used for the purpose. More than one heat-exchanger, of the same or different type, can be used depending on the system configuration.

The drying apparatus can be any conventional dryer which discharges a flow of hot gas which can be used in a heat-exchanger to heat a water stream.

The expression "hot gas" is used herein to indicate a gas which has a temperature higher than ambient temperature and in particular higher than 70° C. The temperature of the hot gas is preferably of at least 85° C., more preferably of at least 100° C. The temperature of the hot gas typically does not exceed 150° C.

In a preferred embodiment of the inventive process, the drying apparatus is a dryer wherein wet precipitated silica is dried to afford precipitated silica.

Any drying apparatus suitable for the drying of powders may be used, such as a spray dryer, a rotary dryer, a fluid bed dryer and the like. Drying of precipitated silica may, advantageously, be carried out by spray drying. For this purpose, any suitable type of spray dryer may be used, such as a turbine spray dryer or a nozzle spray dryer (liquid-pressure or two-fluid nozzle).

In a typical spray drying operation for the drying of precipitated silica the flow of hot gas discharged from the dryer is at a temperature of at least 90° C., even of at least 100° C. The temperature of the hot gas does not exceed 150° C.

The hot gas is typically composed of air and water vapour.

In an energetically advantageous embodiment of the process, water stream $W_i$ is fed to the heat-exchanger at a temperature $T_0$ of from 40 to 80° C. and is heated to a temperature $T_i$ of from 45 to 85° C.

The amount of heat provided to water stream $W_i$ in the heat-exchanger is such that the temperature differential across the membrane in the membrane distillation unit is of at least 5° C., preferably of at least 10° C.

Once the required amount of heat is provided to water stream $W_i$ in the heat-exchanger, water stream $W_i$ is fed to the membrane distillation unit. The heat exchange may take place within the membrane distillation unit or separately from it.

A membrane distillation unit generally comprises at least one membrane, typically a porous hydrophobic membrane, which defines a feed side and a permeate side within the membrane distillation unit.

The term "feed side" is used to identify the side of the unit to which the water stream that has to be concentrated is fed whereas the term "permeate side" is used to identify the side of the unit in which the permeating water is collected.

In the inventive process, water stream $W_i$ containing $Na_2SO_4$, enters the membrane distillation unit on the feed side.

At the inlet of the membrane distillation unit water stream $W_i$ contains $Na_2SO_4$ at a concentration $C_i$ and has a temperature $T_i$ which is greater than the temperature $T_p$ at the permeate side of the membrane distillation unit. Temperature $T_i$ is at least 5° C., preferably at least 10° C., higher than the temperature $T_p$ at the permeate side of the membrane distillation unit. The trans-membrane temperature difference induces a vapour pressure differential causing a vapour flux from the feed side to the permeate side of the membrane distillation unit. Volatile molecules evaporate at the hot liquid-vapour interface, cross the membrane pores in vapour phase from the feed side to the permeate side, and condense at the permeate side of the unit.

The net effect of the process is an increase in the $Na_2SO_4$ concentration on the feed side of the membrane so that water stream $W_f$, exiting the membrane distillation unit, has a $Na_2SO_4$ concentration $C_f$ higher than $C_i$.

Water is obtained on the permeate side of the membrane distillation unit. Said water contains very low amount of impurities, if any, and may be used in any process. For instance it can be recycled into any stage of a precipitated silica manufacturing process.

A temperature differential $T_i-T_p$ of at least 5° C., preferably of at least 10° C., and even of up to 25° C. across the membrane may be used to create a driving force capable of generating considerable vapour flux across the membrane and at the same time a sustainable energy balance. Generally the temperature differential $T_i-T_p$ does not exceed 50° C.

In one embodiment, water stream $W_i$ is maintained at a temperature $T_i$ which is at least 5° C. higher, preferably at least 10° C. higher, than temperature $T_p$.

Water stream $W_i$ may conveniently be maintained at a temperature $T_i$ which is at most 40° C. higher than the temperature $T_p$ at the permeate side of the membrane.

The temperature $T_p$ on the permeate side of the membrane is typically between 25° C. and 50° C. and in any case it is at least 5° C., preferably at least 10° C. lower than the temperature $T_i$ of water stream $W_i$.

Any one of the known membrane distillation techniques can be used in the inventive process.

Non-limiting examples of suitable membrane distillation techniques are:

Direct Contact Membrane Distillation in which both sides of the membrane are charged and in contact with liquid. The condensation of the vapour passing through the membrane happens directly inside the liquid phase at the membrane boundary surface;

Air Gap Membrane Distillation wherein a permeate gap filled with air lies between the membrane and a cooled walling. The vapour passing through the membrane must additionally overcome this air gap before condensing on the cooler surface;

Vacuum Membrane Distillation which contains an air gap channel configuration. Once it has passed through the membrane, the vapour is sucked out of the permeate channel and condenses outside the module;

Vacuum multi-effect membrane distillation. The typical vacuum multi-effect membrane distillation module consists of a steam raiser, evaporation-condensation stages, and a condenser. Each stage recovers the heat of condensation, providing a multiple-effect design. Distillate is produced in each evaporation-condensation stage and in the condenser;

Sweeping Gas Membrane which uses a channel configuration with a gap containing an inert gas on the permeate side.

In one embodiment, the membrane distillation unit used in the inventive process is a direct-contact membrane distillation unit. In another embodiment the membrane distillation unit is an air gap membrane distillation unit. In still another embodiment the membrane distillation unit uses a method whereby vacuum is applied to cause the stream to flow under vacuum or reduced pressure such as a vacuum membrane distillation unit or, preferably, a vacuum multi-effect membrane distillation unit.

Notable examples of suitable membrane distillation units are made commercially available by Memsys, Aquastill, Aquaver, Solar Spring.

The membranes typically used in the membrane distillation unit are hydrophobic polymeric membranes. Suitable membranes may for instance be made of polymeric material such as polytetrafluoroethylene, polyvinylidenefluoride, ethylene/chlorotrifluoroethylene copolymers, polypropylene, polyethylene.

The membrane distillation process can be designed to increase the concentration of $Na_2SO_4$ in the water stream up to the saturation concentration.

The concentration $C_f$ of $Na_2SO_4$ in water stream $W_f$ may be the concentration of a saturated solution at the temperature of the water stream at the exit of the membrane distillation unit. The concentration $C_f$ of $Na_2SO_4$ in water stream $W_f$ may also be lower than the concentration of a saturated solution at the temperature of the water stream at the exit of the membrane distillation unit but in any event higher than $C_0$.

In general, $Na_2SO_4$ may be present in water stream $W_f$ at a concentration $C_f$ of up to 20.0 wt %, even of up to 25.0 wt %, preferably of up to 32.0 wt %. Concentration $C_f$ is typically between 25.0 and 32.0 wt %.

In the inventive process, $Na_2SO_4$ may be recovered in the form of a solution having concentration $C_f$ of $Na_2SO_4$.

Alternatively, $Na_2SO_4$ may be recovered as a solid. In this alternative the inventive process may comprise an additional step of further concentrating water stream $W_f$, e.g. by evaporation, before recovering solid $Na_2SO_4$ for instance by means of a crystallization step.

The inventive process allows recovering $Na_2SO_4$ with a high degree of purity, typically a degree of purity of more than 99.0%, even of 99.5%.

In addition to the steps as detailed above the inventive process may comprise further steps.

Before being submitted to the inventive $Na_2SO_4$ recovery process, water stream $W_0$ may be subjected to preliminary treatments.

Although it has been observed that the suspended and/or dissolved silica contained in water stream $W_0$ does not interfere with the membrane distillation step of the process, physical chemical treatment can be used as a pre-treatment step for the removal of silica and/or other ions, with the addition of certain reagents (coagulants) which act to destabilize the solids present in water stream $W_0$. Examples of suitable coagulants include but are not limited to ferric chloride, aluminum oxide, aluminum chloride, aluminum sulfate, polyaluminum chloride, ferrous or ferric sulfate, calcium oxide and mixtures thereof. Addition of aluminium salts at a slightly alkaline pH, namely at a pH greater than 8, preferably between 8 and 11, has been found effective in reducing the amount of silica and/or other ions present in water stream $W_0$ without causing the loss of $Na_2SO_4$.

After water stream $W_0$ passes through the physical chemical treatment unit, the precipitates can be subsequently removed from the water stream by means known in the art, e.g. in a solid separation unit, prior to further treatment depending on the application.

In an embodiment of the process, the concentration of $Na_2SO_4$ in water stream $W_0$ may be increased before treatment in the membrane distillation unit.

In such an embodiment the concentration $C_i$ of $Na_2SO_4$ in water stream $W_i$ at the inlet of the membrane distillation unit will be greater than the concentration $C_0$. The value of the concentration $C_i$ may be up to 12.0 wt %, even up to 13.0 wt % or even up to 15.0 wt %.

In one aspect of this embodiment a nanofiltration unit may be employed to concentrate water stream $W_0$. Any known type of nanofiltration equipment may be used to increase the concentration of $Na_2SO_4$ in water stream $W_0$, typically polymeric nanofiltration membranes may be employed. Known polymeric nanofiltration membranes may be comprised of polyethersulfone (PES), polyacrylonitrile (PAN) or polyvinylidenefluoride (PVDF) with a typical pore diameter of 1 to 10 nm.

In another aspect of this embodiment of the process, reverse osmosis is used to increase the concentration of $Na_2SO_4$ in water stream $W_0$. Osmosis is the molecular diffusion of solvent across a semi-permeable membrane, which rejects the solute. Osmosis is driven by a chemical potential gradient. This gradient is caused by differences in component concentration, pressure and/or temperature across the membrane. The membrane permeable species (solvent) diffuses from the region of higher activity to a region of lower activity. Reverse osmosis uses hydraulic pressure to overcome the osmotic pressure, and thus reverse the flow of the solvent (water) from the solution containing the solute to the other side of the membrane which is at lower concentration. Any known type of reverse osmosis equipment may be used. Use is generally made of semi-permeable membranes, typically made of polyamides.

Physical chemical treatment and concentration steps, e.g. by filtration, may be carried out independently one of the other.

In an advantageous embodiment of the process a physical chemical treatment step is carried out before submitting water stream $W_0$ to a concentration step.

Nanofiltration and/or reverse osmosis are generally preferred as a method of concentration of water stream $W_0$. In particular it has been found that the use of reverse osmosis is particularly advantageous.

The optional pre-treatment step has the effect of reducing the amount of suspended and/or dissolved silica as well as Ca and/or Mg ions which may be contained in water stream $W_0$.

In this embodiment the process thus comprises the steps of:
providing a water stream $W_0$ comprising $Na_2SO_4$ and at least one of suspended silica, dissolved silica, Ca ions and Mg ions;
treating said water stream $W_0$ to reduce the amount of at least one of suspended silica, dissolved silica, Ca ions and Mg ions contained in said water stream $W_0$;
providing a flow of hot gas discharged from a drying apparatus;
providing heat to water stream $W_0$ in a heat-exchanger by means of the flow of hot gas to obtain water stream $W_i$ at a temperature $T_i$;
providing a membrane distillation unit comprising at least one membrane creating a feed side and a permeate side within the membrane distillation unit;
feeding water stream $W_i$ comprising $Na_2SO_4$ at a concentration $C_i$ to the feed side of the membrane distillation unit at a temperature $T_i$ greater than the temperature $T_p$ at the permeate side of the membrane distillation unit to obtain a water stream $W_f$ containing $Na_2SO_4$ at a concentration $C_f > C_i$; and
optionally separating solid $Na_2SO_4$ from water stream $W_f$.

The process may comprise the additional step of increasing the concentration of $Na_2SO_4$ in water stream $W_f$ before separating $Na_2SO_4$.

The inventive process may also comprise a step wherein a portion of water stream $W_f$, hereinafter referred to as "$W_{f1}$", is separated from water stream $W_f$ and combined with water stream $W_0$ to improve the efficiency of the membrane distillation process. In such an embodiment the process comprises the steps of:
providing a water stream $W_0$ comprising $Na_2SO_4$;
providing a flow of hot gas discharged from a drying apparatus;
providing heat to water stream $W_0$ in a heat-exchanger by means of the flow of hot gas to obtain water stream $W_i$ at a temperature $T_i$;
providing a membrane distillation unit comprising at least one membrane creating a feed side and a permeate side within the membrane distillation unit;
feeding water stream $W_i$ comprising $Na_2SO_4$ at a concentration $C_i$ to the feed side of the membrane distillation unit at a temperature $T_i$ greater than the temperature $T_p$ at the permeate side of the membrane distillation unit to obtain a water stream $W_f$ containing $Na_2SO_4$ at a concentration $C_f > C_i$;
separating water stream $W_f$ in a first water stream $W_{f1}$ and a second water stream $W_{f2}$;
joining water stream $W_{f1}$ with water stream $W_0$; and
optionally separating solid $Na_2SO_4$ from water stream $W_{f2}$.

Water stream $W_{f1}$ is combined with water stream $W_0$ before the heat-exchanger.

Water stream $W_{f1}$ may have the same, a larger or a smaller volume than water stream $W_{f2}$. Generally, water stream $W_{f1}$ has a larger volume than $W_{f2}$.

In some, preferred, embodiments of the process, water stream $W_{f1}$, after optional cooling, may be used as a cold stream in the permeate side of the membrane distillation unit.

When water stream $W_{f1}$ is combined with water stream $W_0$ the combined water stream $W_0 + W_{f1}$ is fed to the heat exchanger to provide water stream $W_i$ at temperature $T_i$.

A second object of the present invention is a process for the manufacture of precipitated silica which comprises a step for recovering $Na_2SO_4$ from a water stream.

In particular the process for the preparation of precipitated silica comprises the steps of:
obtaining precipitated silica in a water reaction medium;
generating a water stream comprising $Na_2SO_4$ by separation and optionally washing of wet precipitated silica from the reaction medium;
drying wet precipitated silica in a drying apparatus, said drying apparatus discharging a flow of hot gas;
recovering $Na_2SO_4$ from the water stream generated in the step of separation and optionally washing of wet precipitated silica by means of the $Na_2SO_4$ recovery process which is the first object of the invention.

All definitions and preferences provided above in respect of the $Na_2SO_4$ recovery process equally apply to the process for the preparation of precipitated silica.

It has been found that the inventive process, which combines the use of the flow of hot gas discharged by the drying of precipitated silica with the operation of a membrane distillation unit, allows a reduction in the energy required for the recovery of $Na_2SO_4$ from wastewater with respect to prior art processes, such as evaporation crystallization.

A further object of the invention is a system for carrying out the process according to the first and second object of the invention. In particular, object of the invention is a system comprising a reactor for the manufacture of precipitated silica, an unit for the filtration and optional washing of precipitated silica, a drying apparatus, a heat exchanger and a membrane distillation unit.

Figure 2:
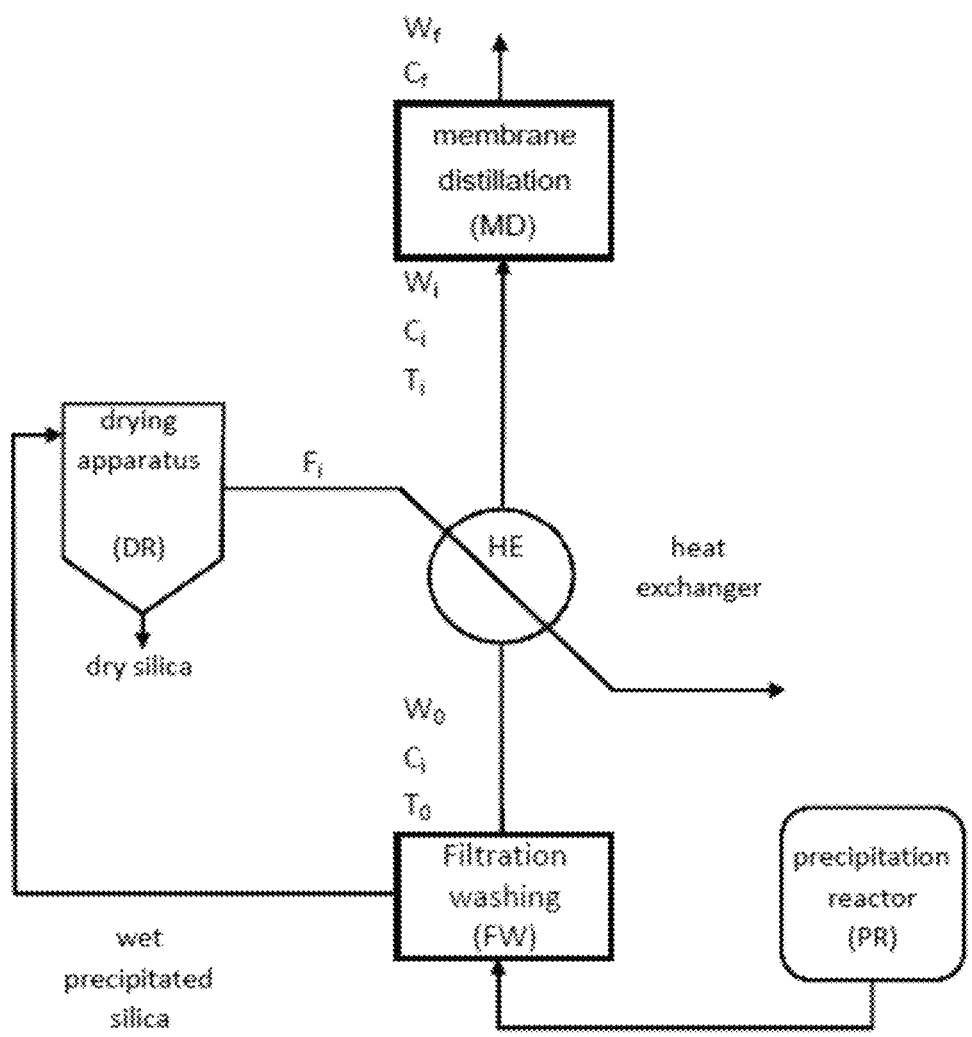
FIG. 2: is a block diagram of a process for the preparation of precipitated silica comprising the inventive process for the recovery of $Na_2SO_4$ showing: a silica precipitation reactor PR; a silica filtration and washing unit FW; a drying apparatus DR; a heat-exchanger HE and a membrane distillation unit MD.
Figure 3:
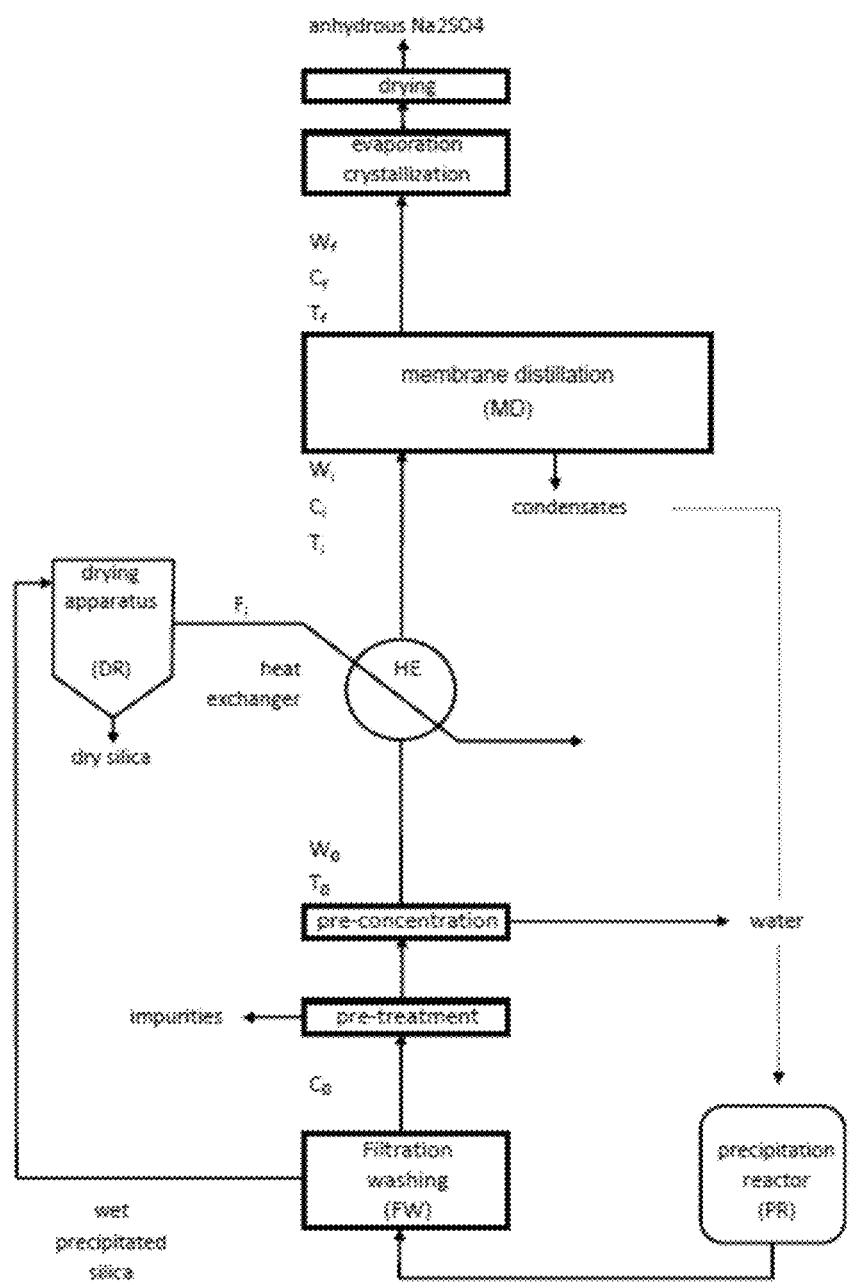
FIG. 3: is a block diagram of an embodiment of the process for the preparation of precipitated silica comprising the inventive process for the recovery of $Na_2SO_4$ showing: a silica precipitation reactor PR; a silica filtration and washing unit FW; a drying apparatus DR; a unit for the pre-treatment of water stream $W_0$; a unit for the pre-concentration of water stream $W_0$; a heat-exchanger HE; a membrane distillation unit MD and a unit for the evaporation/crystallization of solid $Na_2SO_4$ from water stream $W_f$.

FIG. 1 illustrates an embodiment of a system for carrying out the $Na_2SO_4$ recovery process which comprises a water stream $W_0$, a heat exchanger HE, a drying apparatus DR and a membrane distillation unit MD. FIGS. 2 and 3 illustrate embodiments of a system for the preparation of precipitated silica which comprises a reactor for the precipitation of silica, a unit for the separation and optional washing of the wet precipitated silica, a drying apparatus DR for the drying of wet precipitated silica, and a system for carrying out the $Na_2SO_4$ recovery process.

Should the disclosure of any patents, patent applications, and publications which are incorporated herein by reference conflict with the description of the present application to the extent that it may render a term unclear, the present description shall take precedence.

EXAMPLES

The invention is shown by example in the illustrated embodiments. However, it is recognized that other embodiments of the invention having a different configuration but achieving the same or similar result are within the scope and spirit of the claimed invention.

Water stream $W_0$ used in the example was obtained from a precipitated silica manufacturing site. Its composition is provided in Table 1.

TABLE 1

| | |
|---|---|
| pH | 4-5 |
| $Na_2SO_4$ | 4.0-5.5 wt % |
| Suspended solids | 100-200 mg/L, mainly $SiO_2$ |
| Soluble $SiO_2$ | approx. 100 mg/L |
| Ca | approx. 60 mg/L |
| Mg | approx. 3-5 mg/L |

Membrane Distillation Unit

The membrane distillation unit used in the examples comprised two commercial polypropylene membrane modules from Microdyn-Nadir as described in Table 2.

TABLE 2

| | |
|---|---|
| Material | Polypropylene (PP) |
| Type | Hollow fiber |
| No. of fibers | 40 |
| External diameter of the fibers | 1.8 mm |
| Membrane thickness | 120 µm |
| Length of the fibers | 45 cm |
| Surface area | 0.1 m² |
| Nominal pore size | 0.2 µm |
| Shell diameter | 2.1 cm |

Example 3 was carried out on a system additionally comprising a filtration unit. Water stream $W_0$, as received, was submitted to a pre-concentration step by nanofiltration using a membrane: Dow NF270-2540 and under the following conditions: pressure: 35 bar; temperature: 10-20° C.; recirculation flowrate: 300 l/h.

The results are given in Table 3.

TABLE 3

| Time (minutes) | $Na_2SO_4$ in retentate (wt %) | $Na_2SO_4$ in permeate (wt %) | Permeate flowrate (l/h) |
|---|---|---|---|
| 0 | 5.6 | <0.5 | 30.0 |
| 140 | 10.0 | 1.7 | 3.1 |
| 380 | 12.8 | 3.7 | 2.3 |

Water stream $W_0$ was treated in the membrane distillation unit according to three different configurations as summarized in Table 4.

Different feed temperature conditions (ranging from 31 to 51° C.) were utilized. Feed and permeate recirculation flow rates were kept at 200 l/h and 100 l/h, respectively, throughout the experiments.

Each cycle in the experiments corresponds to 8 hour periods of operation of the membrane distillation unit. Depending on the initial concentration of the $Na_2SO_4$ in water stream $W_0$ longer times (i.e. more cycles) were necessary to reach a concentration of $Na_2SO_4$ close to saturation. Pre-treatment with nanofiltration (Example 3) decreased the time needed to reach the crystallization concentration of $Na_2SO_4$.

After the final concentration cycles, crystallization was operated in the membrane module, so that finally two streams are obtained: (i) a high quality water stream and (ii) solid $Na_2SO_4$.

The solid $Na_2SO_4$ was in the thenardite form. Very small amounts of impurities, mainly silicon, were found in the crystal lattice (0.22, 0.14 and 0.06 wt % from solution #1, 2 and 3, respectively).

TABLE 4

| | | Membrane distillation conditions | | | | | | |
|---|---|---|---|---|---|---|---|---|
| | | Feed | | | Distillate | | | Concentrate | |
| | | $Na_2SO_4$ (g/l) | temperature (° C.) | circulation flow rate (l/h) | temperature (° C.) | circulation flow rate (l/h) | permeate flow rate (l/h/m2) | $Na_2SO_4$ (g/l) | concentration factor |
| Example 1 | cycle 1 | 50 | 31 | 200 | 20 | 100 | 0.5 | 69 | 1.38 |
| | | | 38 | | 27 | | 0.8-0.9 | | |
| | | | 51 | | 36 | | 1.6-1.8 | | |
| | cycle 2 | 69 | 31 | | 20 | | 0.6 | 108 | 1.57 |
| | | | 38 | | 24 | | 0.9 | | |
| | | | 50 | | 34 | | 1.7-1.8 | | |
| | cycle 3 | 108 | 38 | | 26 | | 0.8-0.9 | 180 | 1.67 |
| | cycle 4 | 180 | 37 | | 22 | | 0.7-0.8 | 380 | 2.11 |
| Example 2 | cycle 1 | 50 | 31 | | 19 | | 0.6 | 69 | 1.38 |
| | | | 38 | | 23 | | 0.8-1.0 | | |
| | | | 51 | | 33 | | 1.6-1.7 | | |

TABLE 4-continued

Membrane distillation conditions

|  |  | Feed | | | Distillate | | | Concentrate | |
| --- | --- | --- | --- | --- | --- | --- | --- | --- | --- |
|  |  | Na$_2$SO$_4$ (g/l) | temperature (° C.) | circulation flow rate (l/h) | temperature (° C.) | circulation flow rate (l/h) | permeate flow rate (l/h/m2) | Na$_2$SO$_4$ (g/l) | concentration factor |
|  | cycle 2 | 69 | 31 | | 17 | | 0.55 | 110 | 1.59 |
|  |  |  | 38 | | 24 | | 0.8 | | |
|  |  |  | 50 | | 33 | | 1.6-1.7 | | |
|  | cycle 3 | 110 | 37 | | 22 | | 0.8-0.9 | 185 | 1.68 |
|  | cycle 4 | 185 | 36 | | 21 | | 0.6-0.7 | 336 | 1.82 |
| Example 3 | cycle 1 | 132 | 48 | | 37 | | 1.2-1.3 | 278 | 2.11 |
|  | cycle 2 | 278 | 37 | | 31 | | 0.3-0.4 | 319 | 1.15 |

Example 4

Figure 4:
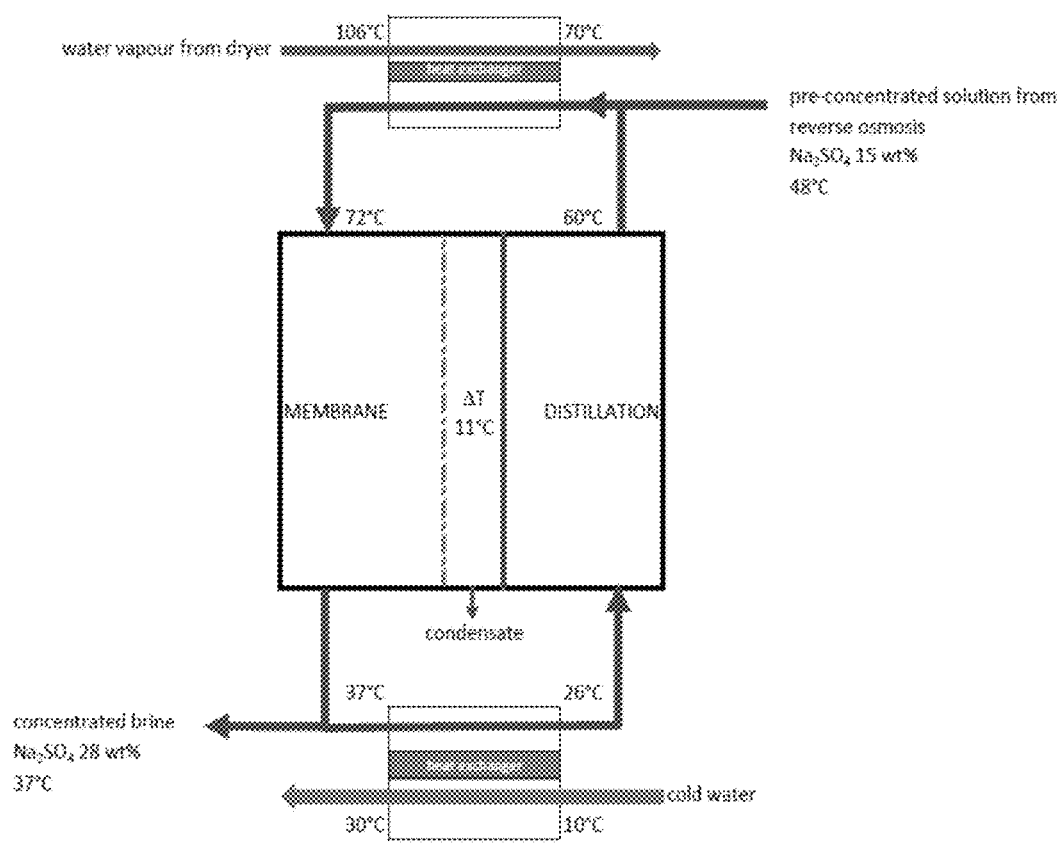
FIG. 4: is a scheme representing one embodiment of thermal integration of a membrane distillation step in a process for the treatment of an industrial aqueous stream containing sodium sulfate in accordance with the present teachings.

The diagram in FIG. 4 illustrates one possible outline of thermal integration of a membrane distillation step in a process for the treatment of an industrial aqueous stream containing sodium sulfate obtained from a precipitated silica manufacturing unit. Na$_2$SO$_4$ concentration in the initial wastewater stream is 5.9 wt %. This stream is first concentrated by reverse osmosis up to 15 wt % in Na$_2$SO$_4$. Temperature at the outlet of reverse osmosis of the Na$_2$SO$_4$-containing water stream is 48° C.

This solution is concentrated up to 28 wt % in Na$_2$SO$_4$ using an air-gap membrane distillation unit.

The heat required to ensure evaporation is recovered by condensing water vapor from the exhaust of the dryer of the silica production, which needs to be cooled from 106° C. down to 70° C.

The invention claimed is:

1. A process for the recovery of Na$_2$SO$_4$ from a water stream, said process comprising the steps of:
    providing heat to a water stream W$_0$ in a heat-exchanger, wherein water stream W$_0$ comprises Na$_2$SO$_4$, by means of a flow of hot gas, said hot gas discharged from a drying apparatus, to obtain water stream W$_i$ at a temperature T$_i$;
    feeding the water stream W$_i$ comprising Na$_2$SO$_4$ at a concentration C$_i$ into a membrane distillation unit having a feed side and a permeate side separated by at least one membrane, wherein the water stream W$_i$ is fed into the feed side of the membrane distillation unit at a temperature T$_i$ greater than the temperature T$_p$ at the permeate side of the membrane distillation unit to obtain a water stream W$_f$ containing Na$_2$SO$_4$ at a concentration C$_f$>C$_i$; and
    optionally separating solid Na$_2$SO$_4$ from water stream W$_f$.

2. The process of claim 1 further comprising the steps of:
    reacting sodium silicate and sulfuric acid in an aqueous liquid medium to obtain a suspension of precipitated silica;
    separating from the aqueous liquid medium and optionally washing the precipitated silica to provide wet precipitated silica and a water stream W$_0$ containing Na$_2$SO$_4$; and
    drying the wet precipitated silica in a drying apparatus, said apparatus discharging a flow of hot gas.

3. The process of claim 1, wherein the amount of heat provided to water stream W$_i$ in the heat-exchanger is such that the temperature differential T$_i$-T$_p$ in the membrane distillation unit is at least 5° C.

4. The process of claim 1, wherein
    water stream W$_0$ comprises Na$_2$SO$_4$ and at least one of suspended silica, dissolved silica, Ca ions and Mg ions; and wherein the process further comprises treating said water stream W$_0$ to reduce the amount of at least one of suspended silica, dissolved silica, Ca ions and Mg ions contained in said water stream W$_0$ before the step of providing heat to water stream W$_0$ in a heat-exchanger.

5. The process of claim 1, further comprising the step of: increasing the concentration of Na$_2$SO$_4$ in water stream W$_0$ by means of nanofiltration or reverse osmosis before the step of providing heat to water stream W$_0$ in a heat-exchanger.

6. The process of claim 1, further comprising the steps of:
    separating water stream W$_f$ into a first water stream W$_{f1}$ and a second water stream W$_{f2}$;
    joining said water stream W$_{f1}$ with water stream W$_0$; and
    optionally separating solid Na$_2$SO$_4$ from water stream W$_{f2}$.

7. The process of claim 1, wherein Na$_2$SO$_4$ is recovered as a solid.

8. The process of claim 7 further comprising the step of increasing the concentration of Na$_2$SO$_4$ in water stream W$_f$ before separating solid Na$_2$SO$_4$ from said water stream.

9. The process of claim 1, wherein the membrane distillation unit is selected from the group consisting of a direct-contact membrane distillation unit, an air gap membrane distillation, a vacuum membrane distillation unit and a vacuum multi-effect membrane distillation unit.

10. The process of claim 1, wherein the drying apparatus is a spray dryer.

11. The process of claim 1, wherein concentration C$_i$ is comprised between 2.0 wt % and 15.0 wt %.

12. The process of claim 1, wherein concentration C$_f$ is 25.0 wt % to 32.0 wt %.

13. A process for the preparation of precipitated silica said process comprising the steps of:
    obtaining precipitated silica in a water reaction medium;
    generating a water stream W$_0$ comprising Na$_2$SO$_4$ by separation of wet precipitated silica from the reaction medium and optionally washing;
    drying the wet precipitated silica in a drying apparatus discharging a flow of hot gas;
    recovering Na$_2$SO$_4$ from water stream W$_0$ by means of the Na$_2$SO$_4$ recovery process as claimed in claim 1.

14. The process of claim 13 wherein precipitated silica is obtained by reaction of an alkaline silicate solution with an acid.

15. A system for carrying out the process of claim 13 said system comprising a reactor for the manufacture of precipitated silica, a unit for the filtration and optional washing of precipitated silica, a spray drying apparatus, a heat exchanger and a membrane distillation unit.

16. The process of claim 3, wherein the amount of heat provided to water stream $W_i$ in the heat-exchanger is such that the temperature differential $T_i$-$T_p$ in the membrane distillation unit is of at least 10° C.

17. The process of claim 14, wherein precipitated silica is obtained by reaction of sodium silicate with sulfuric acid.

* * * * *